United States Patent [19]

Mukohjima et al.

[11] Patent Number: 5,347,192
[45] Date of Patent: Sep. 13, 1994

[54] VIBRATION WAVE MOTOR

[75] Inventors: Hitoshi Mukohjima; Akira Hiramatsu; Kazuhiro Izukawa; Takuo Okuno; Ichiro Okumura, all of Yokohama; Takayuki Tsukimoto, Fujisawa, all of Japan

[73] Assignee: Canon Kabushiki Kaisha, Tokyo, Japan

[21] Appl. No.: 991,716

[22] Filed: Dec. 16, 1992

Related U.S. Application Data

[63] Continuation of Ser. No. 709,800, Jun. 3, 1991, abandoned, which is a continuation of Ser. No. 402,994, Sep. 6, 1989, abandoned, which is a continuation of Ser. No. 169,130, Mar. 10, 1988, abandoned, which is a continuation of Ser. No. 888,338, Jul. 23, 1988, abandoned.

[30] Foreign Application Priority Data

Aug. 5, 1985 [JP] Japan .................. 60-172001
Jun. 30, 1986 [JP] Japan .................. 61-152952

[51] Int. Cl.$^5$ ........................... H01L 41/08
[52] U.S. Cl. ................................ 310/323
[58] Field of Search ................... 310/323, 328

[56] References Cited

U.S. PATENT DOCUMENTS

| 4,325,264 | 4/1982 | Sashida | 310/328 |
| 4,453,103 | 6/1984 | Vishnevsky et al. | 310/328 X |
| 4,495,432 | 1/1985 | Katsuma et al. | 310/328 |
| 4,562,373 | 12/1985 | Tokusima et al. | 310/328 |
| 4,580,073 | 4/1986 | Okumura et al. | 310/328 |
| 4,587,452 | 5/1986 | Okumura et al. | 310/328 |

FOREIGN PATENT DOCUMENTS

| 0209865 | 1/1987 | European Pat. Off. . | |
| 3415628 | 4/1984 | Fed. Rep. of Germany . | |
| 0178988 | 10/1984 | Japan | 310/328 |
| 59-178998 | 11/1984 | Japan . | |
| 0148387 | 8/1985 | Japan | 310/323 |
| 0092778 | 4/1987 | Japan | 310/323 |
| 0011073 | 1/1988 | Japan | 310/323 |
| 2044013 | 10/1980 | United Kingdom . | |
| 2120462 | 11/1983 | United Kingdom . | |

OTHER PUBLICATIONS

Lens Work, Canon, Inc., Commons Co., Ltd. 1992 pp. 161–168.

Primary Examiner—Mark O. Budd
Attorney, Agent, or Firm—Fitzpatrick, Cella, Harper & Scinto

[57] ABSTRACT

A vibration wave motor has a movable member; a molded elastic member having a surface with projections formed thereon for urging the movable member; and a piezoelectric member arranged in contact with the elastic member to apply vibration to the elastic member and produce a travelling vibration wave in the surface of the elastic member.

14 Claims, 4 Drawing Sheets ized across their thickness in sector
VIBRATION WAVE MOTOR This application is a continuation of application Ser. No. 07/709,800 filed Jun. 3, 1991, which is a continuation of application Ser. No. 07/402,994 filed Sep. 6, 1989, which is a continuation of application Ser. No. 07/169,130 filed Mar. 10, 1988, which is a continuation of application Ser. No. 06/888,338 filed Jul. 23, 1988, all now abandoned.

BACKGROUND OF THE INVENTION

1. Field of the Invention

The present invention relates to a vibration wave motor, and more particularly to a structure of a vibration wave motor driven by a travelling vibration wave.

2. Related Background Art

A vibration wave motor utilizes a reciprocal motion generated when a periodic voltage is applied to a piezoelectric vibration element, as a drive force. It has an advantage over a conventional electromagnetic motor in that it is simple and compact in structure because windings are unnecessary and has high torque at a low rotation speed. In such a vibration wave motor, displacement of a vibration member is transmitted to a movable member by a method disclosed in Japanese Patent Application Laid-Open Nos. 178988/1984 and 201685/1984.

FIG. 1 shows the structure of such a prior art vibration wave motor and FIG. 2 illustrates a principle of operation. Numeral 1 denotes piezoelectric elements which function as electro-mechanical transducers, numeral 2 denotes an elastic member which functions as a vibration member, numeral 3 denotes a movable member, numeral 4 denotes a supporting vibration absorber and numeral 5 denotes a base element. The piezoelectric elements 1 are polarized across their thickness in sector areas shown by broken lines as shown by (+) and (−) in a plan view in FIG. 3.

An A.C. voltage $V = V_0 \sin Wt$ is applied from a voltage source (not shown) to the piezoelectric elements (1a for a phase A, and a voltage $V = \pm V_0 \cos Wt$ is applied to the piezoelectric elements 1b for a phase B which are deviated by $\lambda/4$ to generate a travelling bending surface wave (or travelling vibration wave) in the elastic member 2 which is in contact with the piezoelectric elements 1. Thus, the movable member 3, in contact with the elastic member 2 is moved in either direction A or oppositely thereto.

The elastic member 2 has projections 2A for amplifying an amplitude of the travelling bending surface wave. The amplification factor of the amplitude is determined by a length l of the projection 2A (see FIG. 1).

The movable member 3 is in contact with the elastic member 2 under pressure and is moved at a velocity u by a friction force to the elastic member 2. The vibration member comprising the piezoelectric elements 1 and the elastic member 2 is supported by the vibration absorber 4 such as belt so that it does not propagate vibration to the base member 5.

In the vibration wave motor constructed as described above, the elastic member 2 is made of duralumin or brass having a low internal loss of vibration, and the projections 2A are cut from the elastic member 2 by a milling cutter or a wire cutting electric spark machine. However, such methods require a long time and a high cost.

SUMMARY OF THE INVENTION

It is an object of the present invention to improve machining capability to the elastic member without lowering the performance of a motor which uses it.

In accordance with the present invention, the elastic member is divided into an elastic member which contacts the piezoelectric elements and a displacement amplyfying portion such as projections which contact the elastic member and the displacement amplifying portion is integrally molded.

It is another object of the present invention to provide a vibration wave motor which can improve a force $p = \mu W$ and a velocity of the movable member, where $\mu$ is a friction coefficient of the elastic member and the movable member and W is an applied pressure.

The above object is achieved in the present invention by designing the shape of the projections such that a specific vibration frequency of a lateral vibration of the projections of the elastic member is higher than the drive frequency of the motor

DESCRIPTION OF THE PREFERRED EMBODIMENTS

Figure 3:
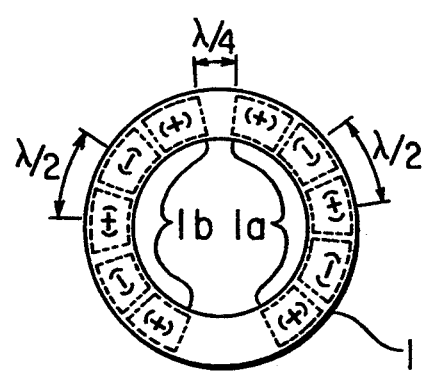
FIG. 3 is a plan view of piezoelectric elements shown in FIG. 1, FIGS. 4 and 5, respectively, are a perspective view and a sectional view of a structure of piezoelectric elements in a vibration wave motor of the present invention.
Figure 4:
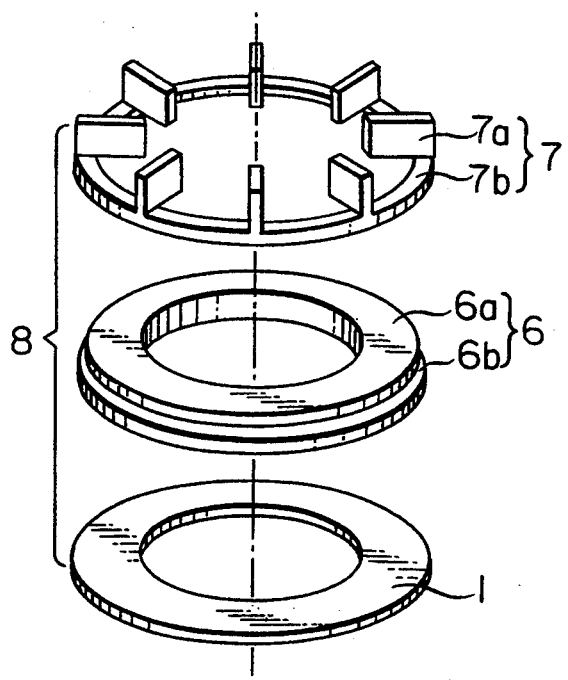
Figure 5:
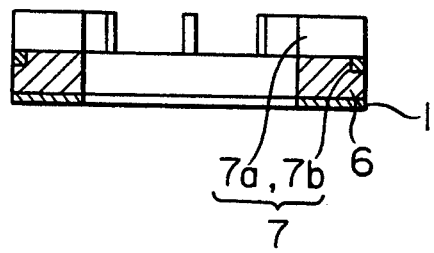

FIGS. 4 and 5 respectively are a perspective view and a sectional view of a vibration member of one embodiment of a vibration wave motor of the present invention. Numeral 1 denotes a piezoelectric member comprising a plurality of piezoelectric elements which function as electro-mechanical transducers. The piezoelectric elements are arranged 1 as shown in FIG. 3. Numeral 6 denotes a known elastic member, numeral 7 denotes an elastic projection member having a plurality of projections 7a and connecting areas 7b. The projections 7a are spaced apart from each other to form gaps therebetween. Each projection 7a has two side surfaces for forming part of the boundary of two of the gaps. The two side surfaces elongate transversely in the direction in which the travelling vibration wave travels. The members 1, 6 and 7 form a vibration member 8. In the present embodiment, the piezoelectric member 1 is same as the prior art one shown in FIG. 3 and the elastic member is different from the one in the prior art device (such as that shown in FIG. 1) and comprises two parts, that is the elastic member 6 and the projection member 7. The elastic member 6 is made of an elastic material such as metal, for example, duralumin or brass having a low internal loss of vibration. The projection member 7 is a mold of aluminum or zinc diecast or resin. The projections 7a and the connecting areas 7b are integrally formed. A step 6b is formed in a periphery of the elastic member 6, and the connecting areas 7b of the projection member 7 are arranged on the step 6b of the elastic member 6, and the bottom surfaces of the projections 7a and a contact area of the elastic member surface 6a are joined in union by adhesive material.

Figure 6:
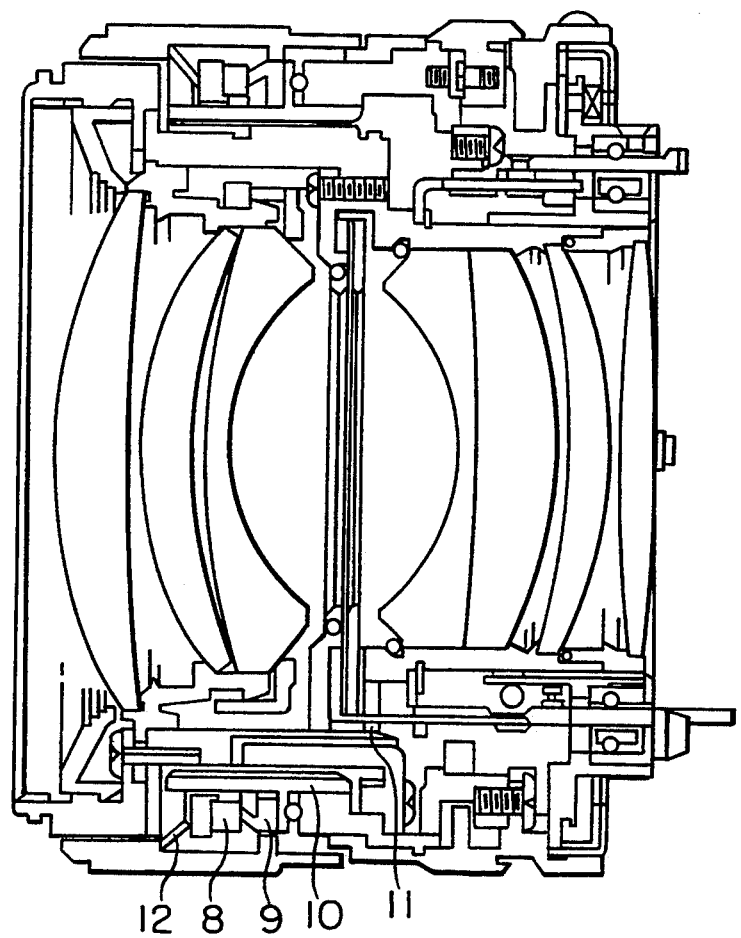
FIG. 6 is a sectional view of a camera lens in which the vibration wave motor of the present invention shown in FIG. 4 is incorporated.

FIG. 6 is a sectional view of a camera lens in which the vibration member 8 shown in FIGS. 4 and 5 is incorporated. In FIG. 6, numeral 8 denotes the vibration member (which is a diagrammatic illustration of the one shown in FIG. 4), numeral 9 denotes a rotor which is movable member contacting to the projections 7a of the vibration member 8, numeral 10 denotes a rotation helicoid which is rotated as the rotor 9 rotates, numeral 11 denotes a straight barrel and numeral 12 denotes a dish-shaped spring for press-contacting the vibration member 8 to the rotor.

The vibration member 8 is press-contacted to the rotor 9 by the dish-shaped spring 12 and a drive signal is applied to the piezoelectric member 1 of the vibration member 8 by an electrical circuit such as one disclosed in U.S. Pat. No. 4,510,411, to generate a vibration wave in the vibration member 8 so that the rotation helicoid 10 is rotated. The rotation helicoid 10 is threaded and the straight barrel 11 is stopped for rotation. As a result, as the helicoid 10 rotates, the straight barrel 11 linearly moves along an optical axis to focus a lens.

The drive circuit for the vibration wave motor in the first embodiment shown in FIGS. 4 to 6 is essentially identical to that shown in U.S. Pat. No. 4,510,411 and hence the explanation thereof is omitted.

FIGS. 7A to 7E shown sectional views of other embodiments of the vibration member in the vibration wave motor of the present invention.

In those figures, numeral 1 denotes a piezoelectric member, numerals 6A to 6E denote elastic members and numerals 7A to 7E denote projection members. Projection members 7A–7E are spaced apart from each other to form slits therebetween. Each projection has two side surfaces for forming part of the boundary of two of the slits. The surfaces elongate transversely in the direction in which the travelling vibration wave travels. Numerals 6aA to 6aE in the elastic members 6A to 6E denote junction planes to be joined with the bottoms of the projection members 7A to 7E, and numerals 6bA to 6bE denote steps for radially positioning connecting areas 7bA to 7bE of the projections. Numerals 7aA to 7aE in the projection members 7A to 7E denote projections and numerals 7bA to 7bE denote the connecting areas for connecting the projections in union. The projection members 7A to 7E are integrally molded like the one shown in FIG. 4.

Figure 7A:
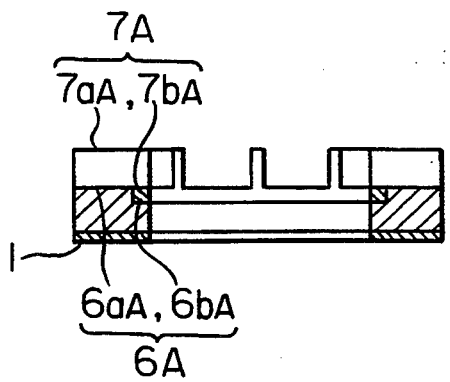
FIGS. 7A to 7E are sectional views of other embodiments of the vibration member of the present invention.

In FIG. 7A, the connecting areas 7b shown in FIG. 4 are arranged inside the ring and the step 6b shown in FIG. 4 is also arranged inside the ring.

Figure 7B:
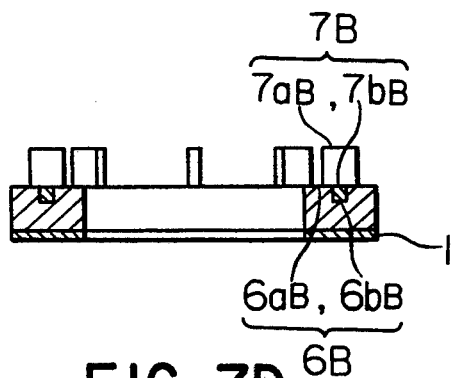

In FIG. 7B, the connecting areas 7b and the step 6b shown in FIG. 4 are arranged at the center of the elastic member 6B and the width of the projection 7b is narrower than the width of the elastic member to reduce the weight.

Figure 7C:
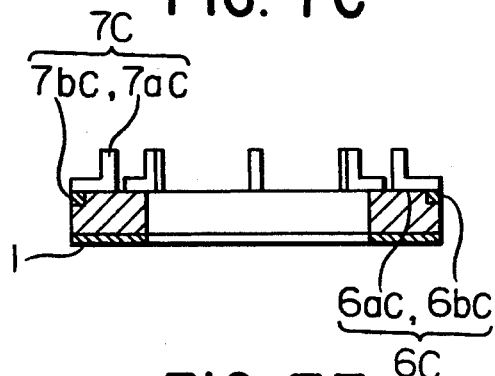

In FIG. 7C, the width of the top of the projection 7a in the embodiment of FIG. 4 is narrowed to reduce the weight.

Figure 7D:
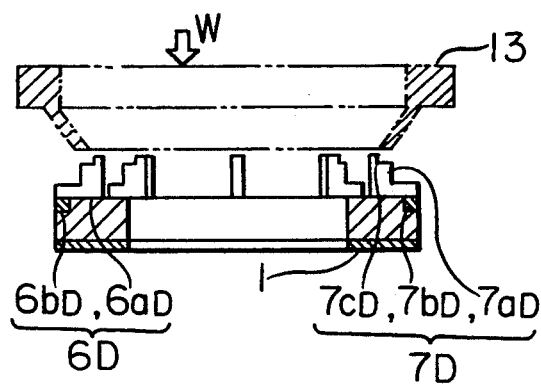

In FIG. 7D, the width of the top of the projection 7a is narrowed as is done in FIG. 7C, a step 7C is provided and a rotor 13 shown by double-chain lines is held by the step 7C to prevent it going off-axis during the rotation.

Figure 7E:
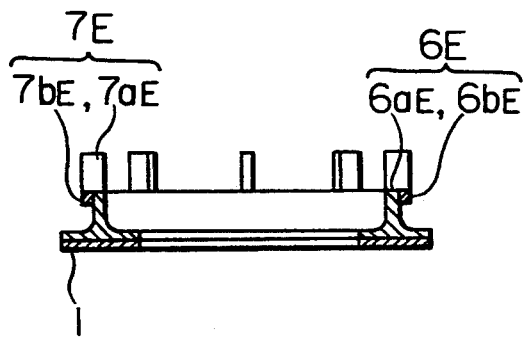

In FIG. 7E, the elastic member 6 having the rectangular section shown in FIG. 4 is shaped to have a non-rectangular section, that is, to have a wider width along the junction with the piezoelectric member 1 and a narrow width along the projections 7E so that a position of a neutral axis is lowered to amplify the amplitude of the travelling vibration wave. In FIG. 7(e), the connecting areas 7bE are arranged on the side of the elastic member 6E.

FIGS. 8 to 12 show other embodiments of the present invention.

Figure 1:
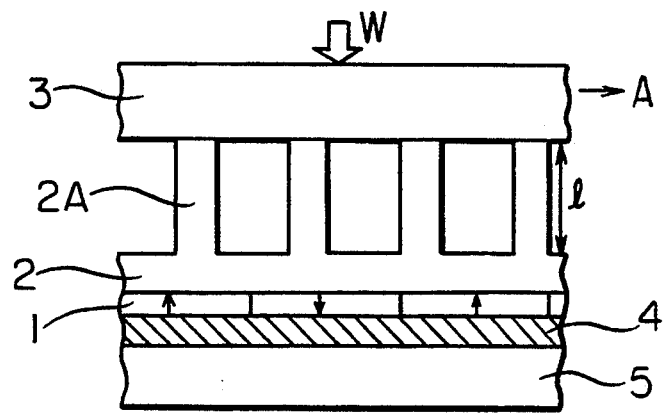
FIG. 1 is a sectional view of a main portion of a prior art vibration wave motor.
Figure 2:
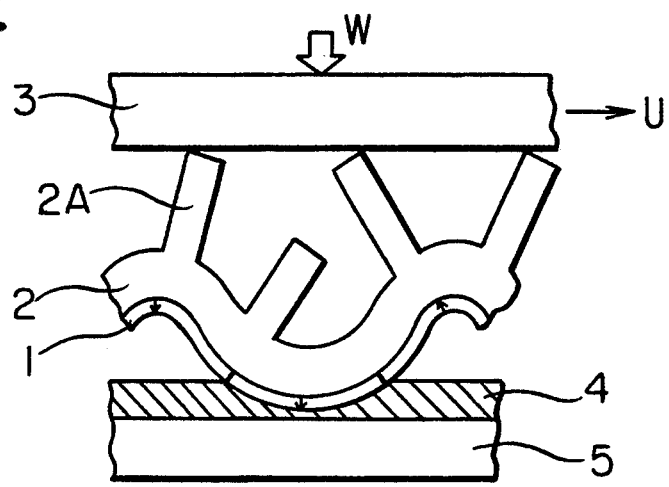
FIG. 2 illustrates an operation of the motor shown in FIG. 1.

In the vibration wave motor shown in FIG. 1, the velocity u of the vibration member 3 can be increased by increasing the length l of the projection 2A, but if the length l of the projection 2A is increased too much, the specific vibration frequency of the lateral vibration of the projection 2A is too low compared to the frequency of the periodic voltage (driving frequency) for driving the motor and the travelling wave of the elastic member 2 is almost absorbed by the friction surface and the force p determined by the frictions coefficient $\mu$ of the friction surface and the pressure W ($p=\mu W$) will not be produced.

On the other hand, if the pressure W is increased, the pressure is concentrated at the bottom of the projection 2A and the travelling wave generated in the elastic member 2 is impeded.

The embodiments shown in FIGS. 8 to 12 resolve the above problems.

Figure 9:
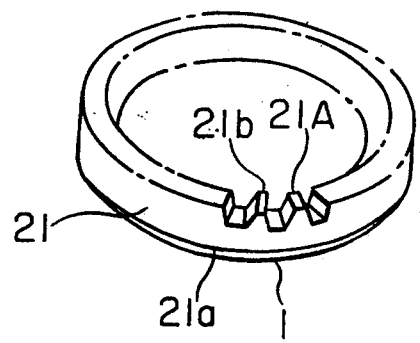
FIG. 9 is a perspective view of the vibration member of the motor shown in FIG. 8, and FIGS. 10 to 12 shown other embodiments of the vibration wave motor of the present invention.

In FIG. 80 numeral 21 denotes an elastic member molded to form the vibration member, unlike the one shown in FIG. 4, the elastic member 21 and the projecting members are integral. Numeral 21A denotes a plurality of projections extending from the base of the elastic member 21. As shown in FIG. 9 (which shows only portions of the projections 21A), the projections 21A are arranged along the entire periphery of the elastic member 21. The projections 21A are shaped such that a specific vibration frequency $\omega_1$ of a lateral vibration of a beam having the bottom surface 21a as a fixed end and the top surface 21b as a free end is higher than the drive frequency of the motor (frequency of the drive signal applied to the piezoelectric member 1 by a drive circuit 1K). The frequency $\omega_1$ is represented by $$\omega_1 = f\left(\frac{1.875}{l}\right)^2 \sqrt{\frac{EI}{\rho A}}$$

where
E: Young's modulus
$\rho$: density
A: average sectional area from the top to the bottom of the projection 21A
I: secondary moment of projection section
l: length from the top surface to the bottom surface of the projection 21A The area of the bottom 21a of the projection 21A is larger than the area of the top 21b in order to reduce the surface pressure applied to the bottom. The drive circuit 1K comprises 101-108 shown in FIG. 4 of U.S. Pat. No. 4,510,411 to apply the drive voltage having predetermined frequency. In the embodiment shown in FIG. 8, the like elements to those shown in FIG. 1 are designated by like numerals and the explanation thereof is omitted. The principle of operation of the vibration wave motor of the present embodiment is similar to that of U.S. Pat. No. 4,510,411.

In the present embodiment, since the projection 21A is shaped as described above, the travelling wave is not impeded even if the length l of the projection 21A is increased or the pressure W is increased. In addition, the force P produced is not reduced. Accordingly, a desired velocity is attained and a large force is produced.

The angle $\theta$ (see FIG. 8) between the side of the projection 21A and the friction surface of the movable member 3 is smaller than 90°. Accordingly, the elastic member 21A of the present embodiment can be readily molded by casting.

Figure 10:
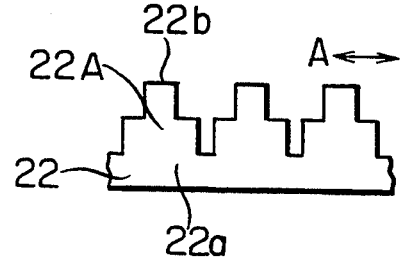
Figure 11:
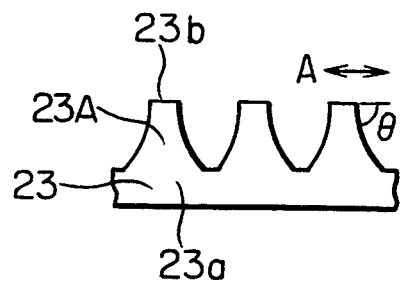
Figure 12:
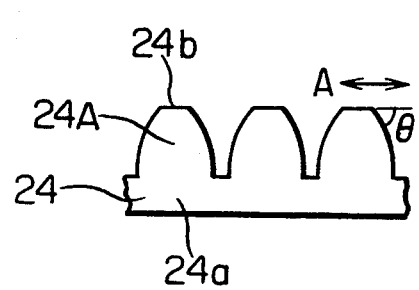

FIGS. 10 to 12 show other embodiments of the vibration wave motor of the present invention, in which only the elastic members are shown. Numerals 22, 23 and 24 denote the elastic members which are similar to the elastic member shown in FIG. 8 except for shapes, and numerals 22A, 23A and 24A denote projections. The direction of travel of the travelling wave is shown by an arrow A.

Figure 8:
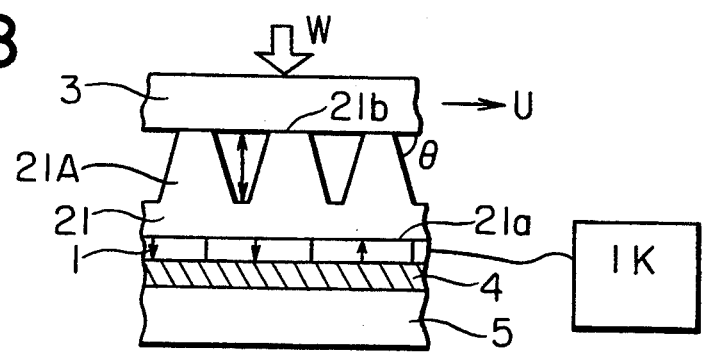
FIG. 8 shows a structure of a main portion of another embodiment of the vibration wave motor of the present invention.

The basic characteristic is same as that of the embodiment shown in FIG. 8. In the embodiment of FIG. 10, the sectional areas of the projection 22A are reduced in multiple steps from the bottom 22a to the top 22b. (two steps in FIG. 10). In FIG. 11, the angle $\theta$ of the projection 23A varies from less than 90° to around 90° between the bottom 23a and the top 23b. In FIG. 12, the angle $\theta$ varies from around 90° to less than 90°.

The same effect may be attained by other shape of the projection which meet the condition that the area of the bottom of the projection is larger than the area of the top.

In accordance with the present invention, since the elastic member having the projections is integrally molded, time and cost to form the projections are significantly reduced.

What is claimed is:

1. A vibration wave motor, comprising:
    a movable member having a friction surface:
    an elastic member being positioned in contact with said movable member; and
    electro-mechanical transducer means for displacing said elastic member, wherein a travelling vibration wave is generated in said elastic member by said electro-mechanical transducer means in response to an applied driving signal of a predetermined frequency;
    wherein said elastic member has projections integrally formed thereon and is arranged to contact said friction surface of said movable member to transmit the travelling vibration wave to said movable member, and wherein a frequency of a first natural mode of bending vibration of each of said projections is higher than the predetermined frequency of the driving signal.

2. A vibration wave motor according to claim 1, wherein a side surface of said projections is disposed at an angle less than 90 degrees relative to said friction surface of said movable member.

3. A vibration member for a vibration wave driven actuator, said vibration member generating a vibration wave therein in response to an applied driving signal and said vibration member having projections arranged to contact a friction surface of a contact member to transmit the vibration wave to the contact member;
    wherein a frequency of a first natural mode of bending vibration of said projections is higher than the frequency of the applied driving signal.

4. A vibration wave driven motor, comprising:
    a movable member having a friction surface; and
    a vibration member for generating a travelling vibration wave therein in response to an applied driving signal of a predetermined frequency, said vibration member having projections integrally formed thereon and being arranged to contact said friction surface of said movable member to transmit the travelling vibration wave to said movable member;
    wherein a frequency of a first natural mode of bending vibration of each of said projections is higher than the predetermined frequency of the driving signal.

5. A vibration wave driven motor, comprising:
    a movable member having a friction surface; and
    an elastic vibration member for generating a vibration wave therein in response to an applied driving signal of a predetermined frequency, said vibration member having projections integrally formed thereon and being arranged to contact said friction surface of said movable member to transmit the vibration wave to said movable member;
    wherein a frequency of a first natural mode of bending vibration of each of said projections is higher than the predetermined frequency of the driving signal.

6. A vibration wave driven motor according to claim 4, wherein a side surface of each of said projections is disposed at an angle less than 90 degrees relative to the friction surface of said movable member.

7. A vibration member for a vibration wave driven motor having a movable member with a friction surface, said vibration member generating a vibration wave therein in response to an applied driving signal of a predetermined frequency, and said vibration member having projections integrally formed thereon and being arranged to contact the friction surface of the movable member to transmit the vibration wave to the movable member;
    wherein a frequency of a first natural mode of bending vibration of each of said projections is higher than the predetermined frequency of the driving signal.

8. A vibration wave driven camera, comprising:
    a movable member having a friction surface and being associated with a helicoid of said camera; and
    an elastic vibration member for generating a travelling vibration wave therein in response to an applied driving signal of a predetermined frequency, said vibration member having projections integrally formed thereon and being arranged to contact said friction surface of said movable member to transmit the vibration wave to said movable member,
    wherein a frequency of a first natural mode of bending vibration of each of said projections is higher than the predetermined frequency of the driving signal.

9. A vibration wave driven motor, comprising:

a movable member having a friction surface;

a ring-shaped elastic projection member having projections integrally formed thereon;

a ring-shaped elastic member having a step portion at the outer periphery portion thereof in which said projection member is positioned; and an electro-mechanical energy conversion member fixed to said stepped elastic member for displacing said stepped elastic member;

wherein a travelling vibration wave is generated in said elastic member by said electro-mechanical energy conversion member in response to an applied driving signal of a predetermined frequency, said projections are arranged to contact the friction surface of said movable member to transmit the travelling vibration wave to said movable member, and a frequency of a first natural mode of bending vibration of each of said projections is higher than the predetermined frequency of the driving signal.

10. A vibration wave driven motor, comprising:

a contact member having a friction surface; and a vibration member for generating a travelling vibration wave therein in response to an applied driving signal of a predetermined frequency, said vibration member having projections integrally formed thereon and being arranged to contact said friction surface of said contact member to transmit the travelling vibration wave to said contact member;

wherein a frequency of a first natural mode of bending vibration of each of said projections is higher than the predetermined frequency of the driving signal, and said vibration wave causes relative movement between said contact member and said vibration member.

11. A vibration wave driven motor, comprising:

a contact member having a friction surface; and an elastic vibration member for generating a vibration wave therein in response to an applied driving signal of a predetermined frequency, said vibration member having projections arranged to contact said friction surface of said contact member to transmit the vibration wave to said contact member;

wherein a frequency of a first natural mode of bending vibration of said projections is higher than the predetermined frequency of the driving signal, and said vibration wave causes relative movement between said contact member and said vibration member.

12. A vibration member for a vibration wave driven actuator, said vibration member generating a vibration wave therein in response to an applied driving signal of a predetermined frequency, and said vibration member having projections arranged to contact a friction surface of a contact member to transmit the vibration wave to the contact member;

wherein a frequency of first natural mode of bending vibration of said projections is higher than the predetermined frequency of the driving signal.

13. A vibration wave driven motor, comprising:

a contact member having a friction surface; and a vibration member for generating a travelling vibration wave therein in response to an applied driving signal, said vibration member having projections integrally formed thereon and being arranged to contact the friction surface of said contact member to transmit the travelling vibration wave to said contact member;

wherein a frequency of a first natural mode of bending vibration of each of said projections is higher than the frequency of the applied driving signal, and said vibration wave causes relative movement between said contact member and said vibration member.

14. A vibration wave driven motor, comprising:

a contact member having a friction surface; and an elastic vibration member for generating a vibration wave therein in response to an applied driving signal, said vibration member having projections arranged to contact said friction surface of said contact member to transmit the vibration wave to said contact member;

wherein a frequency of a first natural mode of bending vibration of said projections is higher than the frequency of the applied driving signal, and said vibration wave causes relative movement between said contact member and said vibration member.

* * * * *

UNITED STATES PATENT AND TRADEMARK OFFICE
CERTIFICATE OF CORRECTION

PATENT NO. : 5,347,192

DATED : September 13, 1994

INVENTOR(S) : MUKOHJIMA ET AL.

It is certified that error appears in the above-indentified patent and that said Letters Patent is hereby corrected as shown below: Title page:

At [63] Related US Application Data

"Ser. No. 888,338, Jul. 23, 1988," should read
--Ser. No. 888,338, Jul. 23, 1986,--.

At [56] References Cited

"59-178998 11/1984 Japan" should read --59-178998 10/1984 Japan--.

Column 1

Line 9, "Jul. 23, 1988," should read --Jul. 23, 1986,--.
Line 44, "phase B" should read --phase B)--.

Column 2

Line 44, "shown" should read --show--.
Line 49, "5 respectively" should read --5, respectively,--.
Line 55, "1" should be deleted.

UNITED STATES PATENT AND TRADEMARK OFFICE
CERTIFICATE OF CORRECTION

PATENT NO. 5,347,192

DATED September 13, 1994

INVENTOR(S) MUKOHJIMA ET AL.

It is certified that error appears in the above-indentified patent and that said Letters Patent is hereby corrected as shown below:

Column 3

Line 39, "shown" should read --show--.

Column 4

Line 29, "frictions" should read --friction--.
Line 56,

"
$$\omega_1 = \int \left(\frac{1.875}{\ell}\right)^2 \sqrt{\frac{EI}{\rho A}}$$
"

should read

--
$$\omega_1 = \int \left(\frac{1.875}{\ell}\right)^2 \sqrt{\frac{EI}{\rho A}} \, d\ell$$
--

UNITED STATES PATENT AND TRADEMARK OFFICE
CERTIFICATE OF CORRECTION

PATENT NO. : 5,347,192
DATED : September 13, 1994
INVENTOR(S) : MUKOHJIMA ET AL.

It is certified that error appears in the above-indentified patent and that said Letters Patent is hereby corrected as shown below:

<u>Column 5</u>

Line 3, "prede-" should read --the prede- --.
    Line 39, "projection" should read --projections--.

<u>Column 6</u>

Line 37, "4," should read --5,--.

Signed and Sealed this

Ninth Day of May, 1995

BRUCE LEHMAN

Attest:

Attesting Officer      Commissioner of Patents and Trademarks